Oct. 12, 1943. M. A. WEST 2,331,819
PRESS WHEEL FOR PLANTERS
Filed June 2, 1941
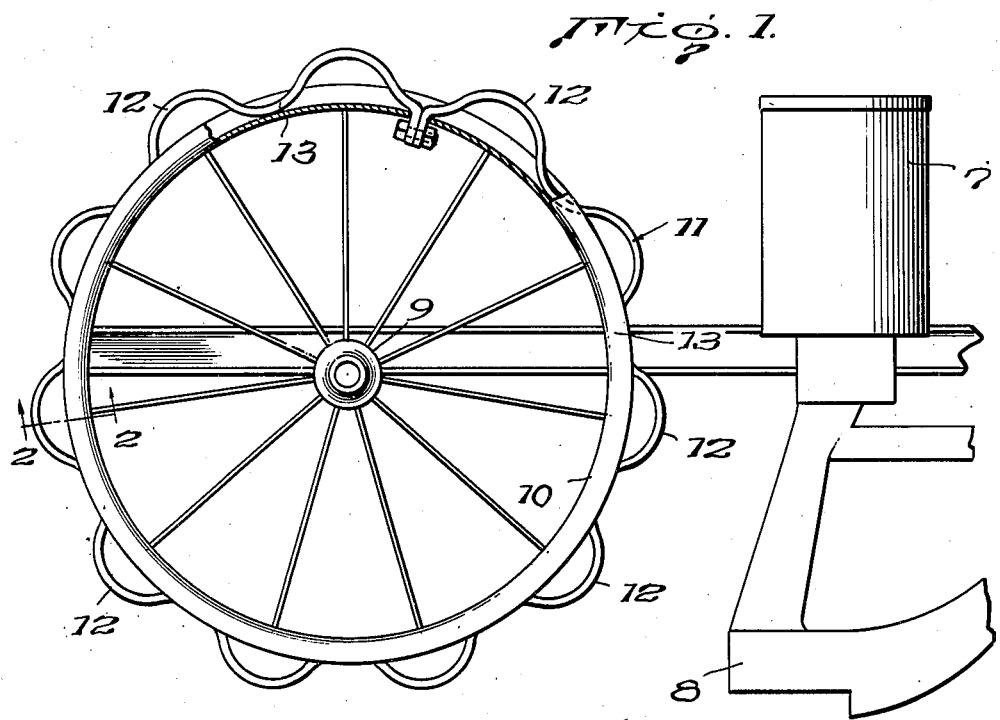

UNITED STATES PATENT OFFICE 2,331,819

PRESS WHEEL FOR PLANTERS

Mack A. West, Paragould, Ark.

Application June 2, 1941, Serial No. 396,345

1 Claim. (Cl. 111—1)

This invention relates to the art of seed planting; its primary object being to provide means for conditioning soil in which seed is planted whereby to procure an all season crop, in which seed germination develops normally in a sequence determined by prevailing weather conditions following planting.

Another object is to provide, as a planter attachment, a forming member which engages seeded ground to provide a series of corrugations whereby the earth is packed around the seed more densely in the low points than in the higher points, without variation in planted depth of the seed.

Other objects will be apparent from the description. In the accompanying drawing:

Figure 1 is an elevation of a planter assembly with a presser wheel of the invention operatively associated therewith.

Figure 2 is a section taken on the line 2—2 of Figure 1.

Figure 3 is an elevation of an alternative embodiment of presser member.

Figure 4 is a fragmentary elevation of still another alternative form of presser.

Figure 5 is a section taken on the line 5—5 of Figure 4.

Figure 6 is a schematic representation of seeded ground with the earth packed and corrugated in accordance with the method and apparatus of this invention.

The present invention has also as an object an improved method of planting by which seed is disposed at uniform planting depth while at the same time being arranged to assure germination in accordance with weather conditions to procure an all season crop.

The invention as illustrated in Figure 1 comprises a conventional planter provided with a seed hopper 7 and shoe 8 in advance of the usual ground wheel 9 which may be either of the type having a closed rim 10 or a sectional open rim 10a; the latter being illustrated in Figures 4 and 5. The wheel has suitably secured on its rim an annular metal strap or band 11 of corrugated form with hill portions 12 equidistantly spaced apart by intervening valley portions 13 which contact the wheel rim. The hill portions project radially from the wheel rim entirely around its periphery to a height of approximately two inches with a spacing of approximately eight inches, and the hills and valleys merge in reverse curves to avoid the creation of angles. The width of the band is less than that of the wheel rim.

In the alternative embodiment illustrated in Figure 3, the band 11a itself forms the rim of the wheel 9a. The band is similar to that previously described, with hill portions 12a spaced by intervening valley portions 13a.

In operation, a row of seed 14 is planted at the proper depth in the prepared earth bed 15, whereupon the immediately following presser member shapes the bed into the form shown in Figure 6, in which the hill portions of the presser pack the earth into valleys between spaced hills which form within the valley portions of the presser. It is a feature of the invention that the presser or forming member does not cause any variation in planting depth of the seed which remain at their proper depth line in relation to ground surface, whether it be at the bottom of a valley, crest of a hill, or on the slopes therebetween.

In forming the valleys in the earth bed 15, however, the earth is compacted in varying degrees below the original surface line which may be defined roughly as the horizontal plane of the hill crests. The earth undergoes maximum packing around the seed at the bottoms of the valleys, and upwardly to the hill crests the degree of packing is progressively less, ranging to no packing at the top.

It is evident, as shown in Figure 6, that although the seeds at the bottoms of the valleys are planted more deeply than those at and toward the top, all seeds are covered by substantially the same amount of earth, but the earth is more firmly packed around the lower seeds than at the top.

The novel method of planting herein disclosed insures that the more densely packed earth conserves moisture and thus enables the seed at the bottoms and lower points of the valleys to germinate in dry weather. If the season be a wet one, the seed at the top not packed or only lightly so will germinate. If the season be neither too wet nor too dry, the seed on the slopes in the medium packed zones will germinate. The production of an all season crop is thus rendered certain, and maximum yield is obtainable irrespective of weather conditions.

I claim:

Soil conditioning means for planters comprising, a wheel having a ground surface bearing rim, a band attached thereto and of less width than the rim, said band being formed with a peripheral series of rounded earth presser portions extending radially beyond the rim and spaced apart by intervening complemental rounded depressed portions contacting the rim.

MACK A. WEST.